United States Patent [19]

Kitagawa et al.

[11] Patent Number: 4,643,550
[45] Date of Patent: Feb. 17, 1987

[54] PHOTOGRAPHING INDICATION DEVICE FOR MICROSCOPES

[75] Inventors: Hisao Kitagawa; Yasuo Inoue, both of Hachiohji, Japan

[73] Assignee: Olympus Optical Co., Ltd., Tokyo, Japan

[21] Appl. No.: 719,541

[22] Filed: Apr. 3, 1985

[30] Foreign Application Priority Data

Apr. 5, 1984 [JP] Japan ................... 59-66645

[51] Int. Cl.⁴ ............................................. G03B 17/48
[52] U.S. Cl. ..................... 354/79; 354/466; 354/289.1
[58] Field of Search ............... 354/465, 466, 471, 472, 354/473, 474, 79, 155, 166, 289.1, 219, 220, 221, 224, 225; 350/562, 565, 566; 33/297, 298

[56] References Cited

U.S. PATENT DOCUMENTS

| | | | |
|---|---|---|---|
| 3,899,791 | 8/1975 | Kerr | 354/155 |
| 3,903,530 | 9/1975 | Taguchi et al. | 354/155 |
| 4,171,896 | 10/1979 | Sato et al. | 354/289.1 |
| 4,255,032 | 3/1981 | Matsumoto et al. | 354/466 |

FOREIGN PATENT DOCUMENTS 38-16580 8/1963 Japan .
56-46568 11/1981 Japan .

*Primary Examiner*—Russell E. Adams
*Attorney, Agent, or Firm*—Cushman, Darby & Cushman

[57] ABSTRACT

A photographing indication device for microscopes comprising a transparent plate-shaped indication member arranged in the optical path of a microscope in such a manner that its surface including engraved indication lines is located at a position conjugate with the image surface of a photographing device, a plurality of light emitting means having different emission colors and arranged on the side of said indication member for illuminating said member, and control circuit equipped with variable resistor for glowing said light emitting means selectively and capable of controlling light intensity with variable resistor, thereby allowing said indication lines to be clearly distinguishable from an image to be observed and illuminated brightly and uniformly even during microscopy under the dark field illumination or reflecting fluorescence illumination.

37 Claims, 10 Drawing Figures

PHOTOGRAPHING INDICATION DEVICE FOR MICROSCOPES

BACKGROUND OF THE INVENTION (a) Field of the Invention:

The present invention relates to a photographing indication device for microscopes.

(b) Description of the Prior Art:

For general photographing with a microscope, it is already known that an indication member having indication lines such as cross lines, double cross lines or a frame indicating a photographing range, can be arranged in the observation optical path at a position corresponding to the image surface of a photographing device, so as to permit accurate focusing or facilitate determination of composition.

Conventionally, the above-mentioned indication lines were composed by stretching piano wires at the required position, or engraving said lines or evaporating chromium on one side of said transparent plate-shaped indication member so as to be clearly observable as dark lines without being mixed with an image to be observed within the visual field during microscopy under the bright field illumination, thereby assuring sufficient brightness within the visual field including said image and background thereof. However, during microscopy under the dark field illumination or reflecting fluorescence illumination, for example, for observing images which are often formed as small bright points scattered against dark background, these indication lines were observable only at areas overlapped with the small images and were invisible against dark background, thereby being practically useless as such.

For this reason, Japanese Patent Publication No. 16580/1963, for example, discloses a composition wherein an indication member having an opaque plate-shaped surface and transparent indication lines is illuminated with a small lamp arranged on the outer circumference thereof. However, illumination is still dark at the position on the opposite side with regard to the optical axis. On the other hand, there is known a composition for an astronomical telescope wherein an indication member with engraved lines in the plate-shaped transparent surface is arranged on a focusing member and illuminated with a light source arranged on one side of the outer circumference of said focusing member. In this case, however, a sand-blasted outer circumference of said transparent member absorbs and scatters the illumination light, thereby degrading illumination efficiency.

Further, Japanese Patent Publication No. 46568/1981 discloses a composition wherein an image of said indication member is formed in the observation optical path so as to be overlapped with an image to be observed by using an illuminating light source, a projecting lens and a beam splitter. However, this composition has a defect that it makes the photographing illumination device complicated and larger.

SUMMARY OF THE INVENTION

A primary object of the present invention is to provide a photographing illumination device for microscopes as adapted as to be capable of displaying indication lines as bright lines clearly distinguishable from or without being mixed with an image to be observed within the visual field even during microscopy using a dark observation visual field such as is formed under the dark field illumination or reflecting fluorescence illumination.

According to the present invention, this object is accomplished by adopting an indication member having indication lines engraved in one surface of its plate-shaped transparent body and so arranged as to locate said surface including said indication lines at a position conjugate with the image surface of the photographing device in the optical path of a microscope and a light source arranged on the side of the outer circumference of said indication member for illuminating said indication member.

Another object of the present invention is to provide a compact photographing device having a simple composition for microscopes.

According to a favourable formation of the present invention, a reflecting surface, integral with or separate from the indication member, is arranged on the outer circumference of said indication member except for the entrance part for the illumination light, and at least said entrance part is finished as a surface for specular reflection. Accordingly, this formation enables to utilize the illumination light effectively, and to illuminate the indication lines brightly and uniformly. The engraved parts to be used as the indication lines may be filled with a light scattering agent such as white paint. It allows the indication lines to appear as bright lines against dark background under the dark field illumination, and as dark lines against bright background under the bright field illumination.

According to another favourable formation of the present invention, the illumination light source comprises two or three light emitting diodes or lamps having different emission colors, and the illumination device is equipped with a means for adjusting intensity of emission from each of these light emitting means. Accordingly, this formation makes it possible to change color and intensity of the illumination light optionally and easily so as to obtain favourable micrographs at all times. Further, the formation is equipped with an indication device for indicating type and intensity of the diode in a manner visible from outside.

These and other objects and advantages will become more apparent during the course of the following detailed description and appended claims.

DESCRIPTION OF THE PREFERRED EMBODIMENTS

Figure 1:
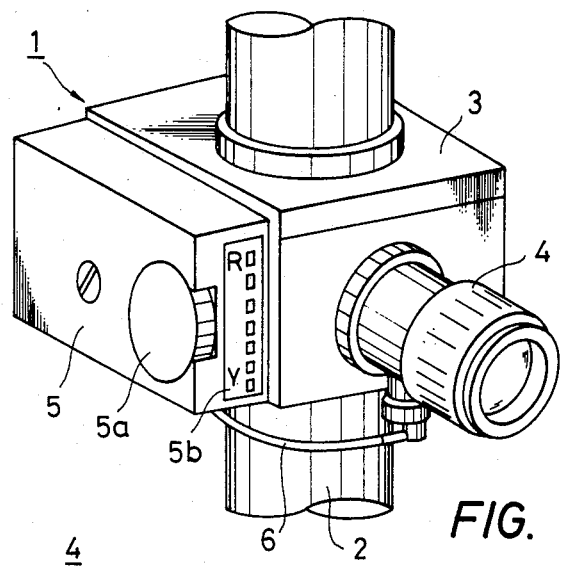
FIG. 1 shows a perspective view illustrating an example of the photographing device according to the present invention.
Figure 2:
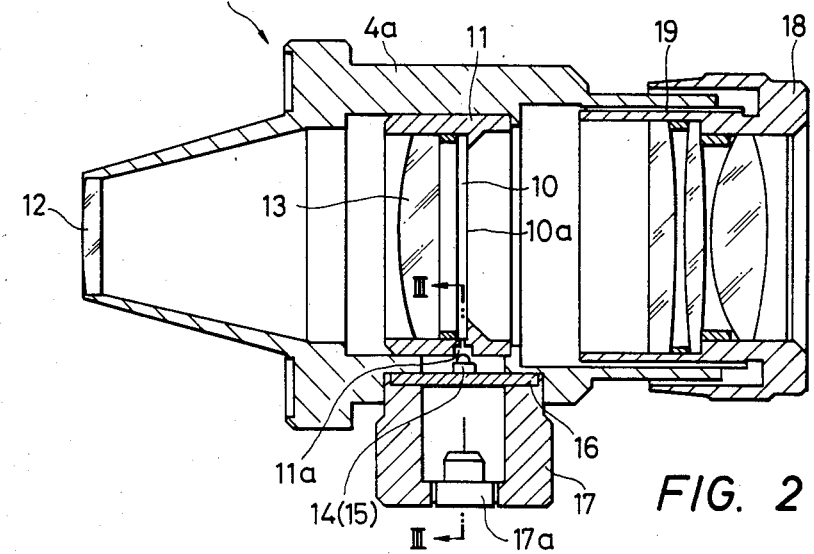
FIG. 2 shows a sectional view illustrating a viewer comprising an embodiment of the photographing indiction device for microscope according to the present invention.
Figure 3:
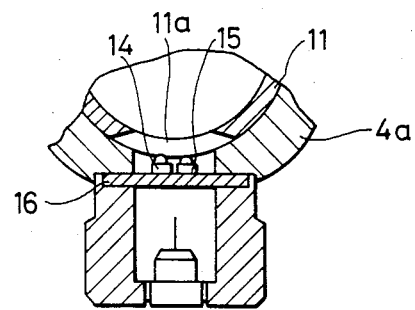
FIG. 3 shows a sectional view taken along the III—III line in FIG. 2.

Now, the present invention will be described in detail with reference to the embodiments shown in the accompanying drawings. In FIG. 1, the reference numeral 1 represents a photographing device equipped with the photographing indication device according to the present invention and attached to a microscope tube 2 by a suitable means. The reference numeral 3 designates a photographing device body equipped with a viewer 4 and a controller 5, and has shutter, etc. necessary for photographing. The controller 5 comprises a control system or control circuit connected to light sources through a cord 6 for controlling said light sources arranged in the viewer 4, and equipped with a control dial 5a and indicator 5b. FIG. 2 shows a sectional view of the viewer 4 wherein the reference numeral 10 represents an indication member having indication lines engraved in one surface (the right side surface 10a in the drawing) of a transparent plate made, for example, of glass, so arranged as to locate said surface 10a at a position conjugate with the image surface of the photographing device 3 and fixed to the frame 4a of the viewer 4 by way of a support frame 11 so that an image to be observed through a microscope is formed on the surface 10a of said indication member 10 by image-forming lenses 12 and 13. The reference numerals 14 and 15 denote light emitting means as, for example, red and yellow light emitting diodes to be used as light sources for illuminating the indication member 10 through a notch 11a formed in the support frame 11, attached to the frame 4a of the viewer 4 through a base plate 16 and fixed with a retainer ring 17, and the reference numeral 18 represents an eyepiece having an eyepiece lens and held movably along the optical path for diopter adjustment by way of a helicoid 19. In addition, the outer circumference of the indication member 10 should preferably be finished for specular reflection and have a reflecting mirror surface except for the area which corresponds to the notch 11a of the support frame 11 so that the rays incident from the light emitting diodes 14 and 15 onto the indication member 10 are reflected on the outer circumference of the indication member 10, whereby the illumination light is effectively utilized and the engraved indication lines are illuminated brightly and uniformly.

Figure 4:
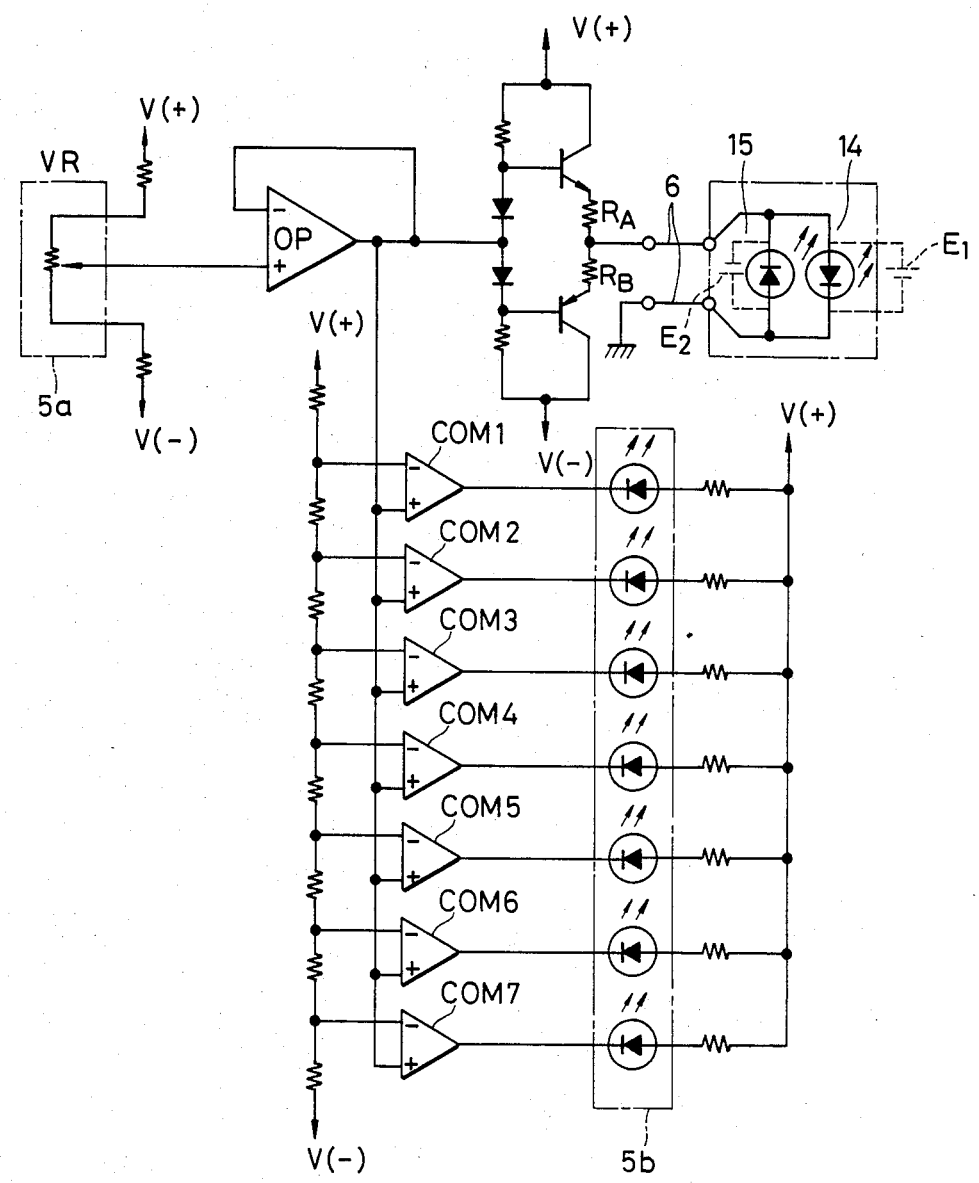
FIG. 4 shows a circuit diagram illustrating an example of a control system in a controller.

FIG. 4 shows two different examples of the control circuit for the controller 5. In FIG. 4, the reference symbol VR represents a variable resistor which is operated by the control dial 5a of the controller 5 shown in FIG. 1, and voltages V(+) and V(−) are applied to both the ends thereof. The diodes 14 and 15 are connected in parallel to each other with polarities thereof reversed, and potential at the sliding contact of the variable resistor VR functions to supply a current to the diodes 14 and 15 through a wire 6 by way of an operation amplifier OP used as a voltage follower, transistors adopted as current buffers and current limiting resistors $R_A$ and $R_B$. Further, seven comparators COM1 through COM7 compare output voltage of the operation amplifier OP with a reference voltage prepared by adequately dividing the voltage of V(+) to V(−) with resistors for indicating a bargraph on an LED array on the indicator 5b of the controller 5 shown in FIG. 1.

Since the embodiment of the present invention has the composition described above, potential is zeroed at the sliding contact of the variable resistor VR and neither of the light emitting diodes 14 or 15 glows when said sliding contact is set at the middle the position. When said sliding contact is shifted toward the V(+) side from the middle position, the potential becomes positive and the light emitting diode 14 is lit by the current flowing through the current limiting resistor RA, whereby the indication lines on the surface 10a of the indication member 10 is illumited with red light. As the sliding contact is shifted further toward the V(+) side, intensity of the red illumination light emitted from the light emitting diode 14 gradually increases. When the sliding contact is shifted toward the V(−) side from said middle point, in contrast, potential at the point becomes negative and the light emitting diode 15 is lit by the current flowing through the current limiting resistor $R_B$, whereby the indication lines on the surface 10a of the indication member 10 is illuminated with yellow light. As the sliding contact is shifted further toward the V(−) side, intensity of the yellow illumination light emitted from the light emitting diode 15 gradually increases. In this case, position of the sliding contact of the variable resistor VR is indicated approximately on the LED array on the indicator 5b of the controller 5. Therefore, the light emitting diodes of the two colors can be switched and intensities of the illumination lights can be controlled by turning the control dial 5a on the controller 5. However, composition of the control circuit is not limited to that shown in FIG. 4.

Figure 5:
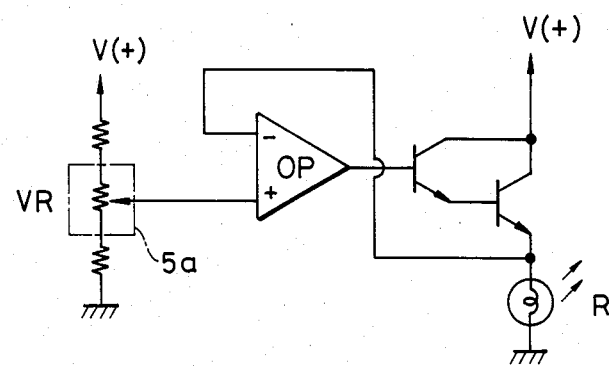
FIG. 5 shows a circuit diagram illustrating another example of the control system in the controller.
Figure 5:
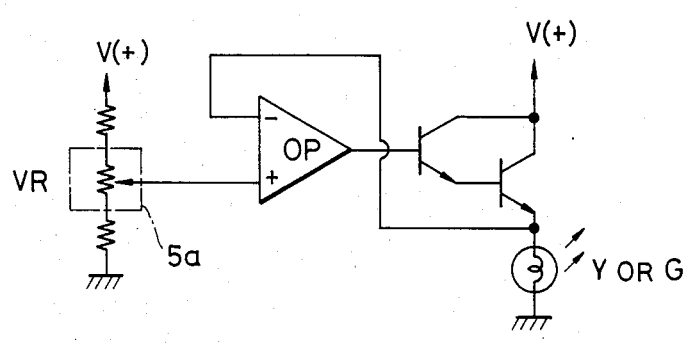
Figure 5:
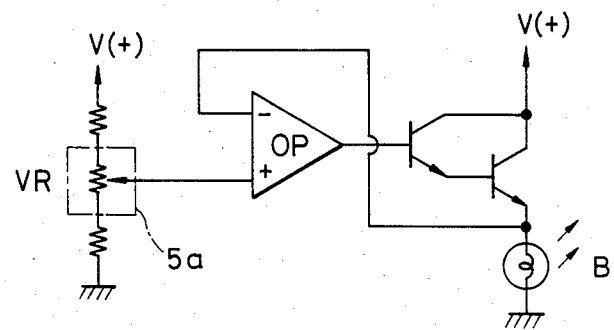

In other words, it is possible to obtain mixed color of illumination light when the sliding contact is set at the middle position and change color of said illumination light gradually into pure monochromatic color as the sliding contact is shifted toward the V(+) or V(−) side by correcting the control circuit in such a manner that the light emitting diodes 14 and 15 emit rays of the same intensity when the sliding contact of the variable resistor VR is located at the middle position with power sources $E_1$ and $E_2$ of the same voltage connected to said light emitting diodes 14 and 15 as shown by the broken lines in FIG. 4. Further, it is possible to change color of the illumination light by mixing two or three colors of illumination lights at various ratios when intensities of different colors of illumination lights emitted from two or three lamps R and Y or R, G and B used as the light emitting means are controlled independently by using control circuits as shown in FIG. 5. For example, a green illumination light can be obtained by lighting red and yellow lamps R and Y simultaneously, and color of illumination light can be controlled in a wide range by adopting three lamps R, G and B of the three primary colors. In this case, it is needless to say that light emitting diodes are usable as the light emitting means. When the photographing indication device for microscope is so designed as to permit selecting various colors as described above, it is possible to prepare legible indication lines within the visual field at any time by selecting a color of the illumination light opposite or contrasting to any basic or inherent color of objects to be observed and controlling intensity of said illumination light. Moreover, the color selection and intensity control of the illumination light can be completely automated by preliminarily determing combinations of colors opposite or contrasting to the basic colors of objects to be observed, storing said combinations in a memory and controlling drive of each light emitting diodes by a micro-processor on the basis of the stored color data table and basic color data obtained from observed objects.

Figure 6A:
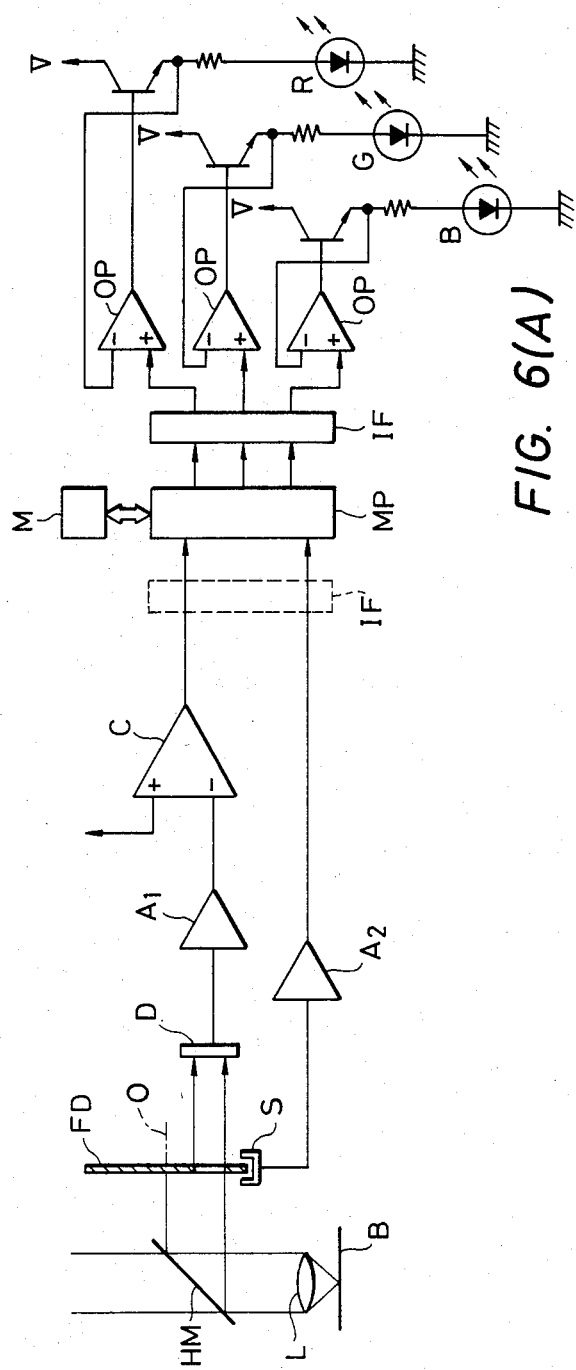
FIGS. 6A and 6B show explanatory views illustrating still another example of the control system in the controller.
Figure 6B:
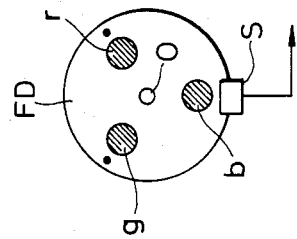

FIG. 6 shows an illustrative diagram exemplifying a control system for such a purpose. In this drawing, the reference symbol B represents an observed object, the reference symbol L designates an objective lens, the reference symbol HM denotes a half mirror arranged, for example, in the microscope tube to which the photographing device 1 is attached, the reference symbol FD represents a filter disk having a red filter r, a green filter g and a blue filter b arranged at equal intervals on a circumference of a circle, placed at the position of the pupil of the observed object B and rotatably supported with a shaft O so as to allow each of said filters to pass through the optical path of the light emitted from said observed object B, the reference symbol S designates a synchronous signal generator arranged in the vicinity of said filter disk FD and so designed as to emit a signal by cooperation with said filter disk FD each time each of said filters r, g and b is put in the optical path, the reference symbol D denotes an optical intensity detecting element so arranged as to receive the light having passed through said filter, the reference symbols $A_1$ and $A_2$ represent amplifiers, the reference symbols C designates an A/D converter, the reference symbol IF denotes an interface, the reference symbol MP represents a micro-processor and the reference symbol M designates a memory. Digital outputs from the A/D converter C are taken discriminately into the microprocessor MP in synchronization with rotation of the filter disk FD, each of the digital signals representing colors b, g and r is compared with said table stored in the memory M, and the micro-processor M provides three outputs to prepare an illumination light having a color opposite or contrasting to the basic color of the observed object B. In this case, each output may be emitted, for example, in such a form as to change duration time of the driving pulse to each of the light emitting diodes R, B and G. In addition, a red lamp, a green lamp and a blue lamp may be used in place of said light emitting diodes R, G and B, and other suitable color analyzing means may be adopted for taking the color information of the light from the observed object B into the micro-processor M simultaneously and cyclically in place of the filter disk FD which cyclically analyzes the colors of the light emitted from the observed object B. Moreover, the control system shown in FIG. 6 can be utilized also for controlling intensity of the light emitted from each of the light emitting means illustrated in FIG. 5.

Figure 7A:
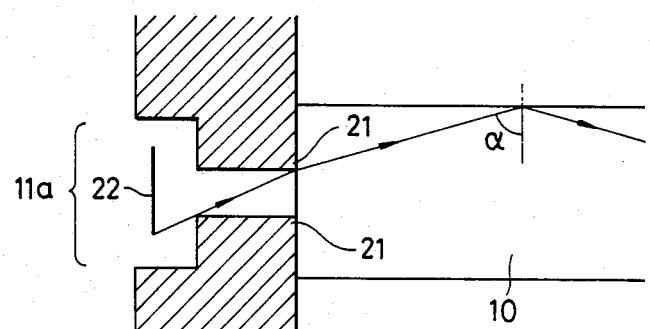
FIGS. 7A and 7B show sectional views on an enlarged scale illustrating a favourable formation of the entrance part for the illumination light into the indication member.
Figure 7B:
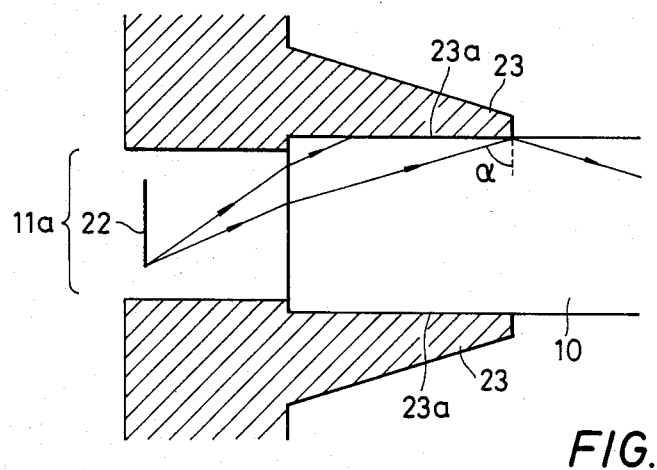

FIG. 7 shows favourable embodiments of the notch 11a formed in the support frame 11 for allowing the illumination light to be incident. In FIG. 7(A), an incidence angle limiting member 21 is provided inside the notch 11a, and all the rays emitted from the schematically illustrated light source 22 are incident on the surface of the indication member 10 at angles larger than the critical angle $\alpha$, whereby the illumination light does not emerge out of the indication member 10, causing no flare of the observed image nor degrading contrast of the observed image. In FIG. 7(B), a masking member 23 projecting from the notch 11a along the surface of the indication member 10 is provided, and the ray incident on the surface of the indication member 10 and emerging from the indication member 10 at an angle smaller than the critical angle $\alpha$, out of the rays emitted from the schematically illustrated light source 22 and incident on the indication member 10, is interrupted by said masking member 23. However, said ray does not return again to the indication member 10 since the surface of said masking member 23 opposed to the indication member 23 is coated with a non-reflective agent. Accordingly, the illumination light does not emerge from the indication member 10 nor badly affect the observed image.

In order that all the rays incident on the indication member 10 are reflected by the surface thereof, the indication member 10 must be made of a transparent material having a refractive index $n_o$, needless to say, larger than refractive index n' of air (n÷1). When refractive index $n_o$ is larger than $\sqrt{2}$, since the rays passing through the side of the indication member 10 into said member are incident on the surface of the indication member 10 perpendicular to said side always at an angle larger than the critical angle $\alpha$ regardless of angle of incidence on said side, all the rays passing through the side of the indication member 10 are reflected by the surface thereof, thereby making it unnecessary to use the incidence angle limiting member 21 or masking member 23 shown in FIG. 7.

Figure 8:
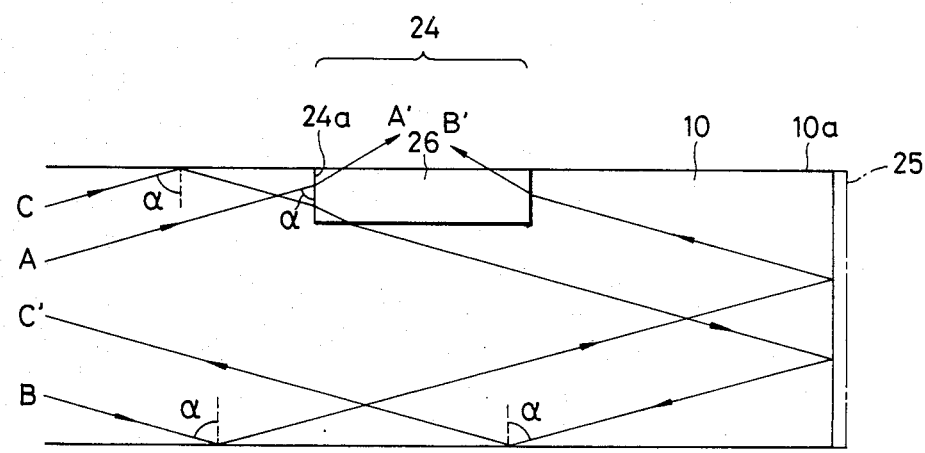
FIG. 8 shows sectional view illustrating the engraved parts on an enlarged scale.

FIG. 8 shows an example of the indication lines formed by engraving. The reference numeral 24 represents an engraving part formed on the surface 10a of the indication member 10 and the reference numeral 25 designates a reflective surface formed on the outer circumference of the indication member 10. Out of the three rays AA', BB' and CC' incident on the surface 10a of the indication member 10 at the critical angle $\alpha$, the ray AA' is incident on the side surface 24a of the engraving part 24 at an angle of $(90° - \alpha)$ and not totally reflected, thereby contributing to illumination of the engraving part 24, the rays BB' is totally reflected by the surface 10a of the indication member 10, then reflected by the reflective surface 25 formed on the outer circumference of said indication member 10 and similarly incident on the side surface of the engraving part 24 at an angle of $(90° - \alpha)$, thereby contributing to illumination of the engraving part 24, and the ray CC' is totally reflected by the surface 10a of the indication member 10, emerges out of the indication member 10 through the side surface 24a of the engraving part 24, and passes again into the indication member 10. The engraving part 24 should preferably be filled with a light scattering agent 26 so that the rays AA', BB' and CC' will be scattered by the light scattering agent 26, when passing into the engraving part 24, for contribution to illumination of said engraving part 24, whereby the illumination light will be scattered in the engraving part 24, and only the side surface of the engraving part will be brightly illuminated, not observed as two lines and observed as a single bright line against dark background. For microscopy under the bright field illumination, the engraving part 24, i.e., the indication lines formed by engraving part will be observable as dark lines against bright background since the light scattering agent 26 filled in the engraving part 24 absorbs the illumination light at a certain ratio. In addition, a white paint is preferably since the photographing indication device uses illumination light of various colors.

As is understood from the foregoing descriptions, the present invention is very effective to observe the indication lines as bright lines clearly distinguishable from or not mixed with an observed image even in microscopy under the dark field observation or reflecting fluorescence illumination, to illuminate said indication lines brightly and uniformly, easily turn color and control intensity of the illumination light, and easily design a compact photographing indication device for microscope.

What is claimed is:

1. A photographing indication device for a microscope, comprising:
   a transparent indication member arranged in an optical path of the microscope, having two substantially parallel transparent surfaces and an outer circumference surface extending between said two parallel transparent surfaces, said outer circumference surface formed with at least one incident light window thereon and being a reflecting surface except for an area of the incident light window;
   at least one indication mark engraved on at least one of said two parallel transparent surface; and
   light source means for illuminating an area, arranged adjacent said incident light window.

2. A photographing indication device for microscopes according to claim 1 wherein a refractive index $n_o$ of said indication member satisfies a condition of $n_o > \sqrt{2}$.

3. A photographing indication device for a microscope according to claim 1 wherein a refractive index $n_o$ of said indication member satisfies a condition of $\sqrt{2} > n_o > 1$ and further comprising means for limiting an angle of incidence of the illumination light.

4. A photographing indication device for microscopes according to claim 1 wherein a refractive index $n_o$ of said indication member satisfies a condition of $\sqrt{2} > n_o > 1$ and further comprising means for masking light emerging from said indication member.

5. A photographing indication device for microscopes according to claim 4 wherein a non-reflective coating is provided between said indication member and said masking means.

6. A photographing indication device for microscopes according to claim 1 wherein said indication line contains a light scattering agent.

7. A photographing indication device for microscopes according to claim 6 wherein said light scattering agent comprises a white paint.

8. A photographing indication device for microscopes according to claim 1 wherein said illumination light source comprises three light emitting means, emitting red light, green light and blue light respectively, and further comprising control means comprising three variable resistors connected to said light emitting means respectively, for controlling intensities of the lights emitted from said light emitting means independently and in parallel.

9. A photographing indication device for microscopes according to claim 8 wherein said light emitting means are light emitting diodes.

10. A photographing indication device for microscopes according to claim 8 wherein said light emitting means are lamps.

11. A photographing indication device for microscopes according to claim 1 wherein said illumination light source comprises three light emitting means, emitting red light, green light and blue light respectively, and further comprising
    filter disk means for cyclically analyzing light emitted from an observed object into red, green and blue components;
    color intensity detecting means for receiving the color light having passed through said filter disk;
    an A/D converter connected to said detecting element;
    a microprocessor connected to said A/D converter;
    a memory connected to said microprocessor; and
    control means connected between said said microprocessor and three light emitting means respectively, for independently controlling intensities of the lights emitted from said light emitting means.

12. A photographing indication device for microscopes according to claim 11 wherein said light emitting means are light emitting diodes.

13. A photographing indication device for microscopes according to claim 11 wherein said light emitting means are lamps.

14. A photographing indication device for microscopes according to claim 1 wherein said illumination light source comprises first light emitting means and second light emitting means, different from each other in colors of emissions, and further comprising a control circuit including a variable resistor connected to said light emitting means, which has a zero potential at a middle position thereof, and
    two power sources connected to said first and second light emitting means respectively and having a same voltage for lighting said light emitting means simultaneously, whereby a color prepared by mixing colors of the lights to be emitted from said first and second light emitting means is obtained when the sliding contact of said variable resistor is set at the middle position thereof, a color of the light emitted from one of said light emitting means being gradually intensified as said sliding contact is shifted in one direction, and a color of the light emitted from the other of said light emitting means being gradually intensified as said sliding contact is shifted in an other direction.

15. A photographing indication device for microscopes according to claim 14 wherein said light emitting means are light emitting diodes.

16. A photographing indication device for microscopes according to claim 14 wherein said light emitting means are lamps.

17. A photographing indication device for microscopes according to claim 14 further comprising an indicator arranged on said photographing device in association with said variable resistor for indicating type of color and intensity of the intensified light emitted from said light emitting means.

18. A photographing indication device for microscopes according to claim 17 wherein said indicator comprises an LED array.

19. A photographing indication device for microscopes according to claim 14 wherein said first light emitting means emits red light and said second light emitting means emits yellow light respectively.

20. A photographing indication device for microscopes according to claim 1 wherein said illumination light source comprises two light emitting means emitting red light and yellow light respectively, and further comprising control means, comprising two variable resistors connected to said two light emitting means respectively, for controlling intensities of the lights emitted therefrom independently and in parallel.

21. A photographing indication device for microscopes according to claim 20 wherein said light emitting means are light emitting diodes.

22. A photographing indication device for microscopes according to claim 20 wherein said light emitting means are lamps.

23. A photographing indication device for microscopes according to claim 1 wherein said illumination light source comprises two light emitting means emitting red light and yellow light respectively, and said photographing indication device further comprises means for decomposing a light emitted from an observed object into red and yellow components, color intensity detecting means for detecting intensities of outputs from said color decomposing means, an A/D converter connected to said detecting means, a microprocessor connected to said A/D converter, a memory connected to said micro-processor, and control means connected between said micro-processor and said two light emitting means respectively for independently controlling intensities of the lights emitted from said light emitting means.

24. A photographing indication device for microscopes according to claim 23 wherein said light emitting means are light emitting diodes.

25. A photographing indication device for microscopes according to claim 23 wherein said light emitting means are lamps.

26. A photographing indication device for a microscope comprising:
a photographing device attached to a microscope tube;
a transparent plate-shaped indication member arranged in an optical path of the microscope and having at least one indication line engraved on one surface thereof; and
illumination light source means arranged on a side of said indication member for illuminating said indication member said illumination light source including at least two light emitting means for emitting a light, said two light emitting means different from each other in emission colors thereof.

27. A photographing indication device for microscopes according to claim 26 wherein said light emitting means are light emitting diodes.

28. A photographing indication device for microscopes according to claim 26 wherein said light emitting means are lamps.

29. A photographing indication device for microscopes according to claim 26 further comprising a means connected to each of said light emitting means for controlling intensity of the light emitted from each of said light emitting means.

30. A photographing indication device for microscopes according to claim 26 further comprising a means connected to each of said light emitting means for selectively lighting at least one of said light emitting means.

31. A photographing indication device for microscopes according to claim 26 further comprising a means connected to each of said light emitting means for selectively lighting at least one of said light emitting means, a means connected to each of said light emitting means for controlling intensity of the light emitted from each of said light emitting means, and an indication means arranged in said photographing device for indicating type of the selected light emitting means and intensity of the light emitted therefrom.

32. A photographing indication device for a microscope comprising:
a photographing device attached to a microscope tube;
a transparent plate-shaped indication member arranged in an optical path of the microscope and having at least one indication line engraved on one surface thereof; and
illumination light source means arranged on a side of said indication member for illuminating said indication member.
wherein said illumination light source means includes two types of light emitting means different from each other in color of emission, and
further comprising a control circuit comprising a variable resistor connected to said light emitting means and which is set at a potential of zero at a middle position thereof,
whereby neither of said light emitting means emits light when the sliding contact of said variable resistor is set at the middle position, one of said light emitting means emits light and an intensity of said light is gradually increased as said sliding contact is shifted toward a negative side, and the other of said light emitting means emits light and an intensity of said light is gradually increased as said sliding contact is shifted toward an other side.

33. A photographing indication device for microscopes according to claim 32 further comprising an indicator arranged in association with said variable resistor on said photographing device for indicating type of the selected light emitting means and intensity of emission therefrom.

34. A photographing indication device for microscopes according to claim 33 wherein said light emitting means are light emitting diodes.

35. A photographing indication device for microscopes according to claim 33 wherein said light emitting means are lamps.

36. A photographing indication device for microscopes according to claim 33 wherein said indicator comprises of an LED array.

37. A photographing indication device for microscopes according to claim 32 wherein one of said two types of light emitting means emits red light and the other emits yellow light.

* * * * *